United States Patent [19]

Newbould et al.

[11] Patent Number: 5,102,438
[45] Date of Patent: Apr. 7, 1992

[54] METHOD OF MANUFACTURING SILICON OPTICAL FIBER HAVING A COMPRESSIVE SURFACE LAYER

[75] Inventors: Richard T. Newbould, Harlow, England; Susan J. Charlton, Roanoke, Va.; Stephen J. Wilson, Cambridge, England

[73] Assignee: STC, plc, London, England

[21] Appl. No.: 147,333

[22] Filed: Jan. 22, 1988

Related U.S. Application Data

[62] Division of Ser. No. 23,984, Mar. 11, 1987.

[30] Foreign Application Priority Data

Sep. 29, 1984 [GB] United Kingdom ............... 8424641

[51] Int. Cl.$^5$ .................. G02B 5/00; C03B 19/00
[52] U.S. Cl. ................... 65/3.12; 65/18.2; 65/18.3; 65/30.1; 65/900; 427/163; 427/167
[58] Field of Search ............... 65/2, 3.11, 3.12, 18.2, 65/18.3, 30.1, 900; 427/163, 167

[56] References Cited

U.S. PATENT DOCUMENTS

| 4,118,211 | 10/1978 | Au Coin et al. | 65/3 R |
|---|---|---|---|
| 4,203,744 | 5/1980 | Schultz et al. | 65/3.11 |
| 4,227,907 | 10/1980 | Merritt | 65/3.12 |
| 4,286,978 | 9/1981 | Bailey et al. | 65/3.12 |
| 4,367,013 | 1/1983 | Guerder et al. | 65/3.12 |
| 4,388,094 | 6/1983 | Carpenter et al. | 65/3.12 |
| 4,402,720 | 9/1983 | Edahiro et al. | 65/3.12 |
| 4,417,910 | 11/1983 | Passaret | 65/18.4 |
| 4,445,754 | 5/1984 | Beales et al. | 65/3.11 |
| 4,501,602 | 2/1985 | Miller et al. | 65/18.3 |
| 4,574,063 | 3/1986 | Scherer | 65/21.4 |
| 4,675,040 | 6/1987 | Tanaka et al. | 65/18.2 |
| 4,747,861 | 5/1988 | Schneider | 65/3.12 |
| 4,765,815 | 8/1988 | Danzuka et al. | 65/3.12 |

FOREIGN PATENT DOCUMENTS

| 8100406 | 3/1981 | PCT Int'l Appl. |
| 8100408 | 3/1981 | PCT Int'l Appl. |
| 2062615 | 5/1981 | United Kingdom |
| 1592234 | 7/1981 | United Kingdom |

Primary Examiner—David A. Simmons
Assistant Examiner—Thi Dang
Attorney, Agent, or Firm—Kerkam, Stowell, Kondracki & Clarke

[57] ABSTRACT

In order to eliminate the effect of water attack on silica optical fibres, the fibres are provided with a surface layer of silicon nitride or silicon oxynitride. The method proposed includes direct nitridation. This may be achieved by adding a nitriding atmosphere to the drawing furnace gases, or to the reactive gases (TiCl$_4$ and SiCl$_4$) incorporated in the flame of an oxyhydrogen torch for the formation of a compressive silica/titania layer on an optical fibre by a glass soot deposition and sintering process.

4 Claims, 1 Drawing Sheet

METHOD OF MANUFACTURING SILICON OPTICAL FIBER HAVING A COMPRESSIVE SURFACE LAYER

This is a divisional, of application Ser. No. 023,984, filed Mar. 11, 1987.

BACKGROUND OF THE INVENTION

This invention relates to optical fibres and, in particular, to the manufacture of optical fibres.

Optical fibres with a thin surface layer of silicon nitride or silicon oxynitride are known to show significant improvements in static fatigue performance as stress corrosion due to water attack is retarded. More recently, such surface layers have been found to be very effective barriers to the diffusion of free hydrogen into optical fibres. The thickness of the coating required is of the order of 200 Å. The methods of production of such known silicon nitride or silicon oxynitride layers on optical fibres involve chemical vapour phase (CVD) techniques.

SUMMARY OF THE INVENTION

According to one aspect of the present invention there is provided a method of manufacturing silica optical fibre including the step of directly nitriding the surface of a silica preform or fibre.

According to another aspect of the present invention there is provided a method of providing a silica optical fibre with a silicon nitride or silicon oxynitride layer thereon including the step of direct nitridation of the surface of the fibre or a preform from which the fibre is to be drawn.

BRIEF DESCRIPTION OF THE DRAWINGS

Embodiments of the present invention will now be described with reference to the accompanying drawings, in which.

DESCRIPTION OF THE PREFERRED EMBODIMENTS

The basic method proposed by the present invention, involves direct nitridation of the silicate surface of an optical fibre preform (or a fibre) to a silicon oxynitride based surface, rather than the CVD techniques referred to above. The glass is converted in the presence of a reducing and nitriding atmosphere at high temperature (~900° C.). Direct nitridation, in order to produce a surface layer of silicon oxynitride on nitride on the surface of silica, is a surface modification technique. That is the existing silica surface is chemically changed, as opposed to CVD methods which deposit further material onto a surface.

Figure 1:
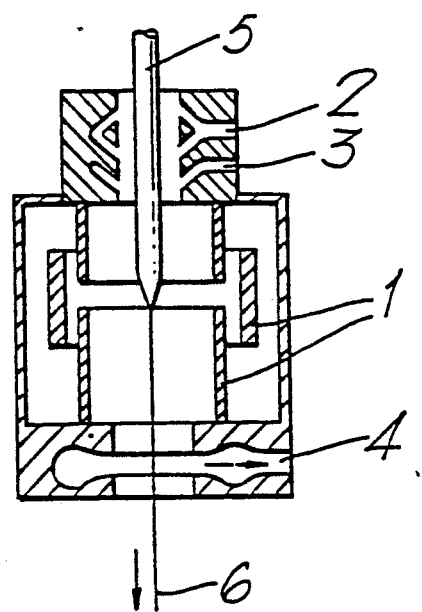
FIG. 1 shows schematically a furnace arrangement for the direct nitridation of the surface of optical fibres.

FIG. 1 illustrates schematically a furnace arrangement for the direct nitridation of optical fibre surfaces. The furnace illustrated is of the carbon resistance type with carbon hearths and element 1 and has a top gas injection means including a port 2 for the introduction of a furnace purge gas and a port 3 for the introduction of a chosen recipe of reactive gases (nitriding atmosphere) into the furnace atmosphere. All gases exiting the furnace are extracted using a radial port 4. A silica based optical fibre preform 5 is, in use of the furnace, drawn into fibre 6 in the conventional manner. Typically the reactive gas may comprise ammonia. The silica based fibre 6 drawn using the furnace has its surface impregnated with nitrogen. That is, the glass surface has amounts of oxygen substituted by nitrogen in the form of oxynitrides.

compressive claddings comprising titania doped silica have previously been applied to silica fibres in order to yield fibres with elevated tensile strength, static fatigue due to water attack is not overcome thereby. Such titania doped silica claddings may be applied to silica glass preforms, which are subsequently drawn down to fibres. When $SiCl_4$ and $TiCl_4$ are heated in an oxy/hydrogen flame, a $SiO_2/TiO_2$ soot results. The size and $SiO_2:TiO_2$ ratio of the soot can be controlled by controlling the various gas flow-rates passing through the oxy/hydrogen torch.

Figure 2:
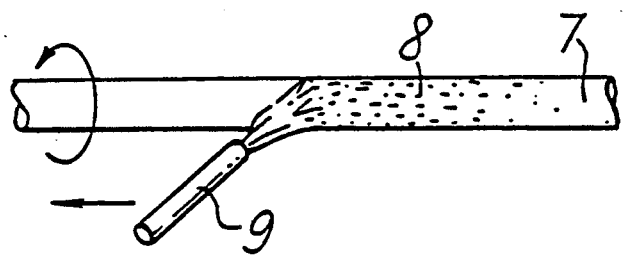
FIG. 2 shows schematically the production of a preform for optical fibres with a surface layer of silicon oxynitride under compressive loading.

A glass preform 7 (FIG. 2) can be coated with the $SiO_2/TiO_2$ soot 8 by rotating it across the flame of the oxy/hydrogen torch 9 and traversing the torch along the length of the preform. The fragile soot adheres loosely to the glass preform when first deposited and may be immediately sintered into compact glass under the action of a heat source, which may be the deposition torch itself. Alternatively, the soot can be sintered during drawing into fibre in the drawing furnace.

$TiO_2$ in solution with $SiO_2$ in low concentrations ($TiO_2$ 10% wt) is a low, or negative, expansion glass. When, for example, a 125 $\mu m$ silica glass fibre has a thin (~5 $\mu m$) layer of this glass over its surface, the "silica bulk" of the fibre draws the $TiO_2/SiO_2$ surface into compression yielding, as mentioned above, a fibre with elevated tensile strength but still subject to water attack. The water attack problem can be eliminated by producing a very thin layer (~200 Å) of silicon oxynitride or silicon nitride over the glass fibre.

Ammonia is able to substitute nitrogen for oxygen in $SiO_2$ or $TiO_2$. Therefore in one way of obtaining the silicon oxynitride or nitride layer it is proposed that during the deposition process the torch also injects $NH_3$ into the vapour stream to yield a soot of silica/titania oxynitride/nitride. The soot is applied to a preform and processed in a similar manner to that described above, resulting in an optical fibre with high strength and high retention of strength. The titania/silica glass contains nitrogen at the molecular level.

Typically the gas flows to the oxyhydrogen torch may be as follows: $TiCl_4$ 198 cc min$^{-1}$; $SiCl_4$ 185 cc min$^{-1}$; $H_2$ 4 to 20 liters min$^{-1}$, $O_2$ 2 to 10 liters min$^{-1}$ (the actual $O_2$ and $H_2$ values depend on the level of sinter required); and $NH_3$ 200 cc min$^{-1}$. Without the ammonia the glass obtained is $SiO_2/\sim 3\%$ $TiO_2$. The torch is specially designed in order to burn a predetermined ratio of titanium and silicon tetrachloride vapours in an oxy/hydrogen flame to produce the aforementioned soot. The torch provides the reactants and heat for the reactions:

The torch also burns to produce heat which sinters the $TiO_2/SiO_2$ soot onto the surface of the silica preform.

Alternatively, the silicon oxynitride or nitride layer may be produced after the $SiO_2/TiO_2$ soot as a separate process, in which case the soot applied to the preform may be only partially sintered prior to direct nitridation and drawing in a furnace as described above with respect to FIG. 1, for example. In both cases, the ratio of coating thickness must be carefully chosen to effect the maximum compressive stress in the surface of the optical fibre. A compressive stress can result in the surface of an optical fibre (silica based) because silica containing traces of titania can exhibit significantly lower thermal expansion coefficients than silica glass. The glass containing titania can also exhibit a slightly high glass transition temperature. Therefore, as an optical fibre is drawn from its preform and freezes in, the bulk of the fibre will contract and compress the low contraction surface.

What is claimed is:

1. A method of manufacturing silica optical fibre having a compressive surface layer, comprising the steps of depositing a glass soot from $TiCl_4$ and $SiCl_4$ on a silica preform by contacting $TiCl_4$ and $SiCl_4$ with the flame of an oxyhydrogen torch in the presence of a nitriding atmosphere, sintering the soot, and forming an optical fibre from the silica preform.

2. A method as claimed in claim 1 wherein the nitriding atmosphere is ammonia.

3. A method as claimed in claim 2 comprising the steps of heating the preform, subsequently to said soot sintering step, to a fibre-drawing temperature and drawing optical fibre therefrom, the drawn fibre having a said compressive surface layer therein which is comprised of titania/silica glass containing nitrogen at a molecular level.

4. A method of manufacturing silica optical fibre having a compressive surface layer comprising the steps of depositing a glass soot of silica/titania oxynitride/nitride from $TiCl_4$ and $SiCl_4$ on a silica preform by contacting $TiCl_4$ and $SiCl_4$ with the flame of an oxyhydrogen torch in the presence of ammonia, sintering the soot, heating the preform with the sintered soot to a fiber-drawing temperature and drawing optical fiber therefrom, the drawn fiber having a said compressive surface layer comprised of titania/silica glass containing nitrogen at a molecular level.

* * * * *